Patented Sept. 27, 1938

2,131,524

UNITED STATES PATENT OFFICE 2,131,524

PROCESS FOR THE PRODUCTION OF ANHYDROUS MAGNESIUM CARBONATE

Rudolf Schulze, Bitterfeld, Germany, assignor, by mesne assignments, to Magnesium Development Corporation, a corporation of Delaware No Drawing. Application April 24, 1935, Serial No. 18,013. In Germany May 19, 1934

6 Claims. (Cl. 23—67)

This invention relates to a process for the production of anhydrous magnesium carbonate (magnesite) from dolomite or limestone.

The present invention provides a process for the production of magnesium carbonate from dolomite or limestone by reaction with magnesium chloride liquor, in which the conversion of the magnesia into neutral anhydrous magnesium carbonate is effected by the application of temperatures somewhat above 150° C. and in presence of an amount of carbon dioxide sufficient to correspond to the equation expressing the reaction, though preferably in moderate excess thereof. The resulting neutral, anhydrous magnesium carbonate, is then separated from the calcium chloride liquor, washed, and freed from still adherent moisture by drying at temperatures preferably in the neighbourhood of 120° C.

When converting crude dolomite or limestone into neutral, anhydrous magnesium carbonate by means of magnesium chloride liquor in presence of carbon dioxide, care has to be taken that an adequate amount of carbon dioxide, preferably in moderate excess should always be present. Should there be, even temporarily, an insufficiency of carbon dioxide, the reaction comes prematurely to an end. Hence, in carrying the invention into practical effect, the rule must therefore be adopted that losses of carbon dioxide— such as might occur, for example, through leakage from the autoclave—must be prevented and that, preferably, a moderate excess even of carbon dioxide should be supplied during the reaction.

According to a two-stage method of carrying out the present process, dolomite, or limestone, is first calcined in known manner and converted by means of magnesium chloride liquor, into magnesium hydroxide and calcium chloride liquor. The reaction mixture is thereupon treated in autoclaves and at temperatures above 150° C. (preferably 150–230° C.) with the carbon dioxide obtained in the calcination of the originating material, and is thereby converted into neutral, anhydrous magnesium carbonate, which can easily be separated from the residual liquor containing calcium chloride.

Far preferably, however, is a second method of carrying out the process, in which the crude dolomite or limestone is suspended in a quantity of magnesium chloride liquor that is at least sufficient for the reaction, and is converted directly into neutral anhydrous magnesium carbonate, at temperatures above 150° C. and preferably with introduction of at least sufficient carbon dioxide to cover any unintentional losses. After cooling down, the reaction mixture is drawn off from the autoclave, and can be filtered without difficulty.

In converting dolomite by the latter modification of the invention it is advisable to employ somewhat higher temperatures than in the case of limestone. When this latter originating material is employed a practically quantitative (100%) conversion is effected, under the specified conditions, even at temperatures as low as about 280° C., whereas, in the case of dolomite, temperatures of about 330° C. are needed to obtain this result if only the theoretically calculated amount of magnesium chloride liquor is employed. If, on the other hand, an excess of said liquor be employed, the reaction temperature will be substantially lower. For example, with 2 molecules of magnesium chloride to 1 molecule of limestone, the reaction is practically complete at 200° C.—and at about 230° C. in the case of dolomite—with formation of a magnesite having a lime content corresponding to that of a pure native magnesite. The amount of the impurities—$SiO_2.Al_2O_3.Fe_2O_3$ and sulphate—present depends solely on the degree of purity of the originating materials taken whilst any chloride present can be completely removed by a thorough washing.

If it is desired to obtain mixtures of anhydrous neutral magnesium carbonate and magnesium hydroxide, this can be effected by prematurely interrupting the supply of carbon dioxide, or by allowing a portion of the carbon dioxide to escape from the autoclave during the conversion. This is possible in view of the fact that the dehydration of the magnesium hydroxide present is completed at 400° C.; that is, at a temperature at which the anhydrous neutral magnesium carbonate is not as yet decomposed with liberation of carbon dioxide.

Examples (1) 100 kgs. of finely ground limestone (with 98% of $CaCO_3$) and 550 litres of liquor (with 340 grms. of $MgCl_2$ per litre) are heated for 2 hours at 200° C. (pressure 14 atmospheres), in an autoclave—lined with acid-resisting material—with introduction of gaseous carbon dioxide (under about 1 atmosphere pressure) and intensive agitation. After cooling in the heat exchanger, the artificial magnesite is filtered and washed. The product, dried at 120° C. weighs 85 kgs.

(2) 200 kgs. of finely ground dolomite (with 53% of $CaCO_3$ and 45% of $MgCO_3$) and 600 litres of $MgCl_2$ liquor are treated in the foregoing manner for three hours at 230° C. (pressure 26 atmospheres), 173 kgs. of magnesite being obtained. The residual liquor, containing about 170 grms. of MgCl₂ and 200 grms. of CaCl₂ per litre, may be employed, for example, in the treatment of calcined limestone or dolomite, for the production of magnesium hydroxide.

*Composition of the magnesium carbonate*

| Percent— | 1 | 2 |
|---|---|---|
| MgO | 46.5 | 46.0 |
| CaO | 0.5 | 0.9 |
| Al$_2$O$_3$ | 0.1 | 0.3 |
| Fe$_2$O$_3$ | 0.1 | 0.2 |
| SiO$_2$ | 0.2 | 0.5 |
| CO$_2$ | 50.8 | 49.8 |
| SO$_3$ | 0.3 | 0.3 |
| Cl | 0.1 | 0.1 |
| H$_2$O | 0.8 | 1.0 |

I claim:

1. A process for the production of anhydrous neutral magnesium carbonate from a substance selected from the group consisting of dolomite and limestone which comprises, reacting the substance selected with magnesium chloride liquor in a pressure vessel in the presence of carbon dioxide at a temperature of at least about 150° C. and at a pressure sufficient to maintain said liquor at such temperature.

2. A process for the production of anhydrous neutral magnesium carbonate from a substance selected from the group consisting of dolomite and limestone which comprises, reacting the substance selected in an aqueous medium of magnesium chloride liquor in a pressure vessel in the presence of carbon dioxide, said carbon dioxide being present in an amount at least sufficient to convert all the magnesium compound present to neutral magnesium carbonate, and said reaction being carried out at a temperature of at least 150° C. and at a pressure sufficient to maintain said liquor at such temperature.

3. A process for the production of anhydrous neutral magnesium carbonate from a substance selected from the group consisting of dolomite and limestone which comprises, reacting the substance selected with magnesium chloride liquor in a pressure vessel in the presence of carbon dioxide, said magnesium chloride liquor being present in an amount sufficient to convert the calcium compounds contained in the selected substance into calcium chloride with the precipitation of all the magnesium compounds in the form of magnesium hydroxide, and said reaction being carried out at a temperature of at least about 150° C. and at a pressure sufficient to maintain said liquor at such temperature, while preventing the escape of carbon dioxide from the reaction mixture.

4. A process for the production of anhydrous neutral magnesium carbonate from a substance selected from the group consisting of dolomite and limestone which comprises, reacting the substance selected with magnesium chloride liquor in a pressure vessel in the presence of carbon dioxide, said magnesium chloride liquor being present in an amount sufficient to convert the calcium compounds contained in the selected substance into calcium chloride with the precipitation of all the magnesium compounds in the form of magnesium hydroxide, and said reaction being carried out at a temperature between about 270° C. and 350° C. and at a pressure sufficient to maintain said liquor at such temperature, while preventing the escape of carbon dioxide from the reaction mixture.

5. A process for the production of anhydrous neutral magnesium carbonate from a substance selected from the group consisting of dolomite and limestone which comprises, reacting the substance selected with magnesium chloride liquor in a pressure vessel in the presence of carbon dioxide, said magnesium chloride liquor being present in an amount sufficient to convert the calcium compounds contained in the selected substance into calcium chloride with the precipitation of all the magnesium compounds in the form of magnesium hydroxide, and said carbon dioxide being present in an amount at least sufficient to convert all the magnesium compounds formed into neutral magnesium carbonate, said reaction being carried out at a temperature of at least about 150° C. and at a pressure sufficient to maintain said liquor at such temperature, while preventing the escape of carbon dioxide from the reaction mixture.

6. A process for the production of anhydrous neutral magnesium carbonate from a substance selected from the group consisting of dolomite and limestone which comprises, reacting the substance selected with magnesium chloride liquor in a pressure vessel in the presence of carbon dioxide, said magnesium chloride liquor being present in an amount sufficient to convert the calcium compounds contained in the selected substance into calcium chloride with the precipitation of substantially all the magnesium compounds in the form of magnesium hydroxide, and said carbon dioxide being present in an amount at least sufficient to convert all the magnesium compounds formed into neutral magnesium carbonate, said reaction being carried out at a temperature between about 270° C. and 350° C. and at a pressure sufficient to maintain said liquor at such temperature, while preventing the escape of carbon dioxide from the reaction mixture.

RUDOLF SCHULZE.